(12) United States Patent
Atake et al.

(10) Patent No.: US 12,030,090 B2
(45) Date of Patent: Jul. 9, 2024

(54) WIPING MEMBER, WIPING METHOD, AND IMAGE FORMING APPARATUS

(71) Applicant: RICOH COMPANY, LTD., Tokyo (JP)

(72) Inventors: Takumi Atake, Kanagawa (JP); Akira Izutani, Osaka (JP); Yohta Sakon, Kanagawa (JP); Hiroko Ohkura, Kanagawa (JP); Yuusuke Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 759 days.

(21) Appl. No.: 16/981,175

(22) PCT Filed: Mar. 6, 2019

(86) PCT No.: PCT/JP2019/008898
§ 371 (c)(1),
(2) Date: Sep. 15, 2020

(87) PCT Pub. No.: WO2019/176691
PCT Pub. Date: Sep. 19, 2019

(65) Prior Publication Data
US 2021/0016327 A1  Jan. 21, 2021

(30) Foreign Application Priority Data

Mar. 16, 2018  (JP) ................................. 2018-049359
Nov. 8, 2018  (JP) ................................. 2018-210538

(51) Int. Cl.
*B08B 13/00* (2006.01)
*B08B 1/14* (2024.01)
(Continued)

(52) U.S. Cl.
CPC ................ *B08B 1/143* (2024.01); *B08B 3/08* (2013.01); *B32B 5/022* (2013.01); *B32B 5/26* (2013.01);
(Continued)

(58) Field of Classification Search
None
See application file for complete search history.

(56) References Cited

U.S. PATENT DOCUMENTS

2003/0156877 A1\*  8/2003  Tischer .................... B41J 17/42
400/247
2005/0229843 A1  10/2005  Nishi et al.
(Continued)

FOREIGN PATENT DOCUMENTS

CN  1676337 A  10/2005
CN  104070812  10/2014
(Continued)

OTHER PUBLICATIONS

Google Patents translation of JP2008137266A (Year: 2023).\*
(Continued)

*Primary Examiner* — Eric W Golightly
(74) *Attorney, Agent, or Firm* — Grüneberg and Myers PLLC

(57) ABSTRACT

A wiping member to wipe a nozzle surface of a liquid discharging head includes a first layer configured to be brought into contact with the nozzle surface and one or more other layers, wherein the following relation is satisfied: t1<t2, where t1 represents the thickness of the first layer and t2 represents the thickness of the one or more other layers, wherein the porosity of the first layer is smaller than the porosity of at least one of the one or more other layers.

14 Claims, 5 Drawing Sheets

(51) Int. Cl.
  *B08B 3/08*   (2006.01)
  *B32B 5/02*   (2006.01)
  *B32B 5/26*   (2006.01)
  *B41J 2/165*  (2006.01)

(52) U.S. Cl.
  CPC ... *B41J 2/16535* (2013.01); *B32B 2262/0253* (2013.01); *B32B 2262/0276* (2013.01); *B32B 2262/062* (2013.01); *B32B 2307/726* (2013.01); *B32B 2432/00* (2013.01); *B41J 2002/1655* (2013.01)

(56) References Cited

U.S. PATENT DOCUMENTS

| | | | |
|---|---|---|---|
| 2007/0017053 A1* | 1/2007 | Chen | A47L 13/16 15/244.4 |
| 2009/0008142 A1 | 1/2009 | Shimizu et al. | |
| 2013/0265366 A1 | 10/2013 | Murayama et al. | |
| 2014/0247305 A1 | 9/2014 | Fukuda et al. | |
| 2014/0292919 A1 | 10/2014 | Kobayashi et al. | |
| 2017/0119226 A1 | 5/2017 | Nakayama et al. | |

FOREIGN PATENT DOCUMENTS

| | | |
|---|---|---|
| CN | 205767862 U | 12/2016 |
| CN | 205856783 | 1/2017 |
| CN | 106661787 | 5/2017 |
| JP | 5-84918 A | 4/1993 |
| JP | 2008-137266 | 6/2008 |
| JP | 4940917 82 | 5/2012 |
| JP | 2014-000704 | 1/2014 |
| JP | 2014-188900 | 10/2014 |
| TW | 200800609 | 1/2008 |

OTHER PUBLICATIONS

International Search Report and Written Opinion issued on May 28, 2019 in PCT/JP2019/008898 filed on Mar. 6, 2019.
Combined Chinese Office Action and Search Report issued Jun. 2, 2021 in Chinese Patent Application No. 201980019554.7, citing documents AA and AO through AR therein, 6 pages, not in English.
Chinese Office Action issued Dec. 1, 2021 in Chinese Application No. 201980019554.7, 8 pages.
"Foam Concrete", Harbin Institute of Technology Press, Jan. 31, 2016, 15 pages.
P. Kumar Mehta, "Concrete Structure, Properties and Materials", Nov. 30, 1991, 21 pages.
Basic knowledge of non-woven fabric, Table 1, "Properties of General Purpose Fibers", created based on Fibers Handbook 2009, published by Japan Chemical Fibers Association, 2009, pp. 222-223 with English translation of p. 223, 3 pages.
JISL1015:2010, "Test Methods for man-made staple fibres", Japan IT Week, RX Japan, 2010, pp. 1-52 with partial translation of Chapter 8.14, 56 pages.

* cited by examiner

PRIOR ART

PRIOR ART

WIPING MEMBER, WIPING METHOD, AND IMAGE FORMING APPARATUS

TECHNICAL FIELD

The present disclosure relates to a wiping member, a wiping method, and an image forming apparatus.

BACKGROUND ART

In a liquid discharging device such as an inkjet printer, foreign matter on a nozzle surface causes a problem such as defective discharging. Therefore, the nozzle surface requires regular cleaning. A cleaning method using a wiping member for cleaning a nozzle surface formed by combining a sheet-shaped wiping member made of non-woven fabric and woven fabric has been proposed.

PTL 1 describes a wiping member that prevents deterioration of a water repellent film on a nozzle surface. This wiping member includes a first layer to be brought into contact with the nozzle surface and a second layer disposed onto the first layer on the opposite side relative to the nozzle surface. A liquid dispersion medium on the nozzle surface is guided to and absorbed in the second layer due to capillary action in the first layer in contact with the nozzle surface, and dispersoids are trapped in voids of the first layer.

CITATION LIST

Patent Literature

PTL 1: Japanese Unexamined Patent Application Publication No. 2014-188900

SUMMARY OF INVENTION

Technical Problem

However, in a cleaning method using a typical wiping member, ink appearing on the nozzle surface as a result of adhesion to the nozzle surface and natural drying thereon is not sufficiently wiped. To sufficiently wipe off this adhesion ink, it is necessary to increase wiping frequency or a wiping pressure, which involves deterioration of a water repellent film formed on the nozzle surface.

According to the present disclosure, a wiping member is provided which is capable of efficiently wiping ink adhering to a nozzle surface of a liquid discharge head.

Solution to Problem

The issue described above can be solved by using the wiping member of the following 1 relating to the present disclosure.

1. A wiping member to wipe the nozzle surface of a liquid discharging head, includes a first layer configured to be brought into contact with the nozzle surface and one or more other layers, wherein the following relation is satisfied: t1<t2, where t1 represents the thickness of the first layer and t2 represents the thickness of the one or more other layers, wherein the porosity of the first layer is smaller than the porosity of at least one of the one or more other layers.

Advantageous Effects of Invention

The wiping member of the present disclosure is capable of efficiently wiping ink adhering to a nozzle surface of a liquid discharge head.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
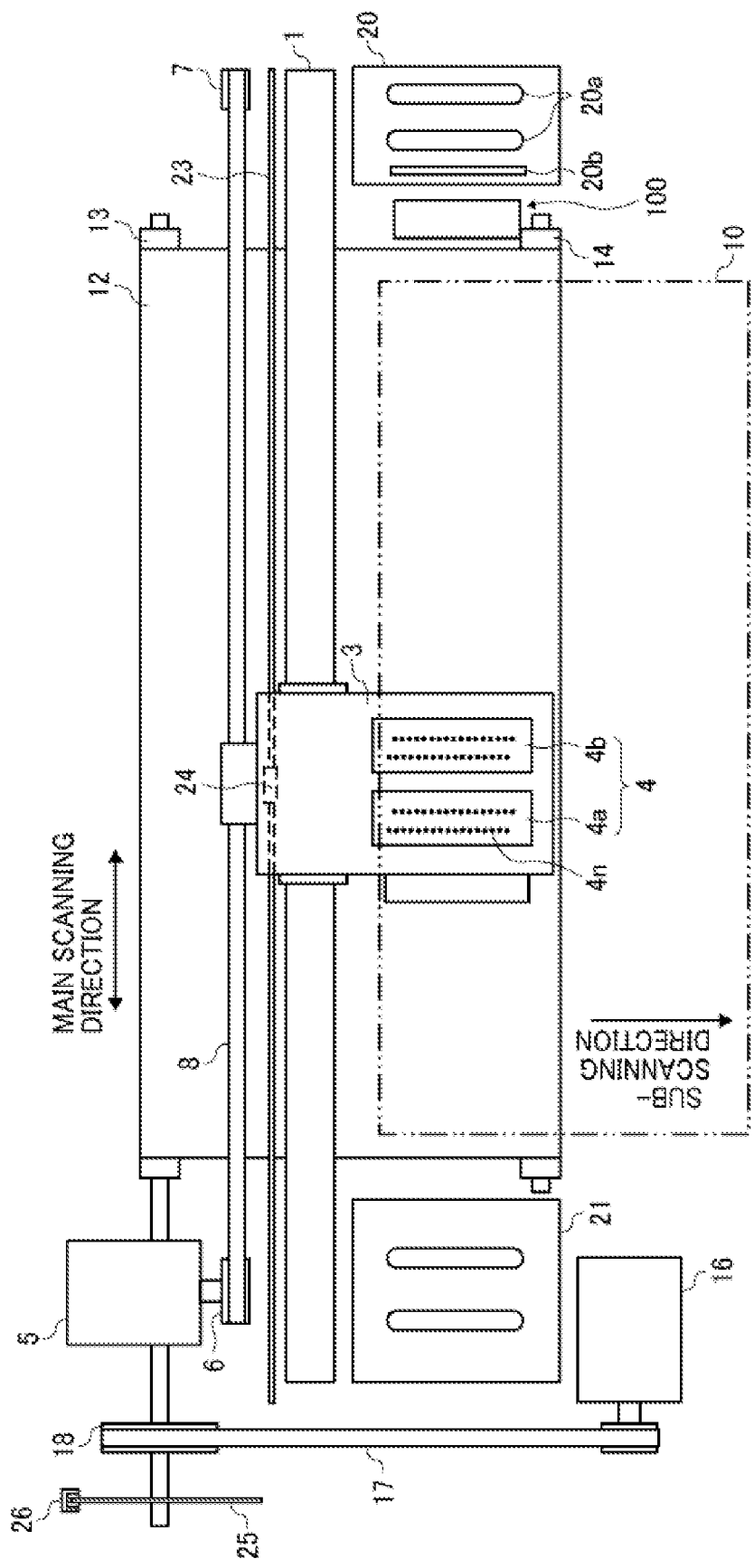
FIG. 1 is a diagram illustrating an example of an image forming apparatus.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Moreover, image forming, recording, printing, modeling, etc. in the present disclosure represent the same meaning, unless otherwise specified.

The present disclosure relates to the wiping member described in 1 mentioned above and also includes the following 2 to 13 as embodiments of the present disclosure. Therefore, these are described as well.

2. The wiping member according to 1 mentioned above, wherein the porosity of the first layer is from 0.60 to 0.85.

3. The wiping member according to 1 or 2 mentioned above, wherein the porosity of the first layer is from 0.75 to 0.80.

4. The wiping member according to any one of 1 to 3 mentioned above, wherein the first layer is made of non-woven fabric.

5. The wiping member according to any one of 1 to 4 mentioned above, wherein the porosity of at least one of the one or more other layers is from 0.80 to 0.99.

6. The wiping member according to any one of 1 to 5 mentioned above, having a thickness of from 0.1 to 3 mm.

7. The wiping member according to any one of 1 to 6 mentioned above, wherein the one or more other layers includes at least two layers and the following relations are satisfied: t1<t4; and t3<t4, where t3 represents the thickness of the farthermost layer of the one or more other layers located farthermost from the first layer, t4 represents the total thickness the one or more other layers excluding the farthermost layer, wherein the porosity of the first layer and the porosity of the farthermost layer are smaller than the porosity of at least one of the one or more other layers excluding the farthermost layer.
8. The wiping member according to 7 mentioned above, wherein the porosity of the farthermost layer is from 0.60 to 0.85.
9. The wiping member according to 8 mentioned above, wherein the porosity of the farthermost layer is from 0.75 to 0.80.
10. A wiping method includes relatively moving a liquid discharging head and a wiping member and wiping a nozzle surface of the liquid discharging head by the wiping member, wherein the wiping member includes a first layer configured to be brought into contact with the nozzle surface and one or more other layers, wherein the following relation is satisfied: t1<t2, where t1 represents the thickness of the first layer and t2 represents the thickness of the one or more other layers, wherein the porosity of the first layer is smaller than the porosity of at least one of the one or more other layers.
11. The wiping method according to 10 mentioned above, wherein the one or more other layers includes at least two layers and the following relations are satisfied: t1<t4; and t3<t4, where t3 represents the thickness of the farthermost layer of the one or more other layers located farthermost from the first layer, t4 represents the total thickness of the one or more other layers excluding the farthermost layer, wherein the porosity of the first layer and the porosity of the farthermost layer are smaller than the porosity of at least one of the one or more other layers excluding the farthermost layer.
12. The image forming device includes a liquid discharging head including a nozzle surface and a wiping member configured to wipe the nozzle surface by relatively moving against the liquid discharging head, the wiping member including a first layer configured to be brought into contact with the nozzle surface and one or more other layers, wherein the following relation is satisfied: t1<t2, where t1 represents the thickness of the first layer and t2 represents the thickness of the one or more other layers, wherein the porosity of the first layer is smaller than the porosity of at least one of the one or more other layers.
13. The image forming device according to 12 mentioned above, wherein the one or more other layers includes at least two layers and the following relations are satisfied: t1<t4; and t3<t4, where t3 represents the thickness of the farthermost layer of the one or more other layers located farthermost from the first layer, t4 represents the total thickness of the one or more other layers excluding the farthermost layer, wherein the porosity of the first layer and the porosity of the farthermost layer are smaller than the porosity of at least one of the one or more other layers excluding the farthermost layer.

The present disclosure relates to a wiping member to wipe the nozzle surface of a liquid discharge head and has following features.

The wiping member includes at least two layers.

The following relation is satisfied: t1<t2, where t1 represents the thickness of the first layer configured to be brought into contact with the nozzle surface and t2 represents the thickness of the one or more other layers (i.e., the layers other than the first layer).

The porosity of the first layer is smaller than the porosity of at least one of the one or more other layers.

First, the image forming apparatus and the wiping method that use the wiping member of the present disclosure are described.

The image forming apparatus of the present disclosure includes a liquid discharging head and the wiping member of the present disclosure that relatively moves against the liquid discharge head to wipe the nozzle surface of the liquid discharge head.

The wiping method of the present disclosure includes relatively moving a liquid discharge head and the wiping member of the present disclosure and wiping the nozzle surface of the liquid discharge head with the wiping member.

FIG. 1 is a diagram illustrating an example of the image forming apparatus, which includes a serial liquid discharge device. The image forming apparatus is described with reference to FIGS. 1 and 2.

A carriage 3 is movably held by a main guide member 1 and a sub-guide member, that are bridged between left and right side plates. A main scanning motor 5 drives the carriage 3 to reciprocate in the main scanning direction (carriage moving direction) via a timing belt 8 looped around a drive pully 6 and a driven pully 7.

The carriage 3 carries liquid discharging heads 4a and 4b (referred to as liquid discharging head 4 if distinction thereof is not necessary). The liquid discharging head 4 discharges color ink droplets of, for example, yellow (Y), cyan (C), magenta (M), and black (K). The liquid discharging head 4 carries nozzle arrays Na and Nb each having multiple nozzles 4n disposed along the sub-scanning direction vertical to the main scanning direction with the ink discharging surface downward.

Figure 2:
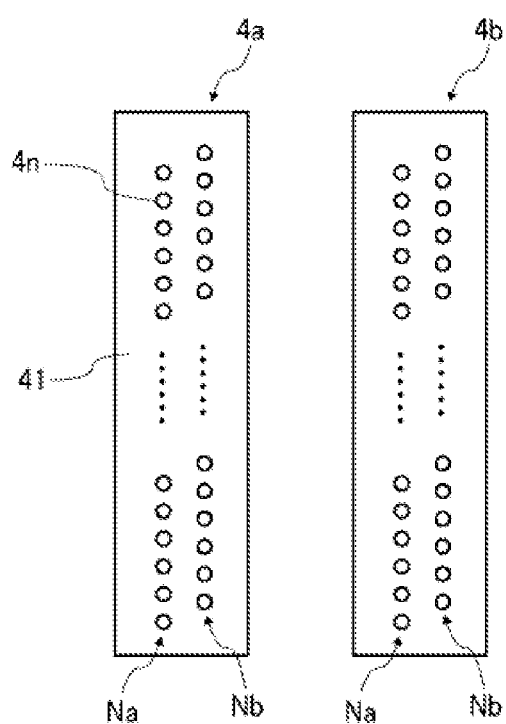
FIG. 2 is a diagram illustrating an example of the configuration of a nozzle plate to be wiped by a wiping member.

As illustrated in FIG. 2, the inkjet recording head 4 has two nozzle arrays Na and Nb, each including multiple nozzles 4n.

As the liquid discharging head constituting the liquid discharging head 4, for example, it is possible to use a piezoelectric actuator such as a piezoelectric element and a thermal actuator that utilizes the phase change caused by film boiling of liquid by using an electric heat conversion element such as a heat element.

The liquid discharging head has a conveyor belt 12 serving as a conveying device to convey the sheet 10 at the position facing the inkjet discharging head 4 by electrostatic adsorption. The conveyor belt 12 takes an endless form, looped around a conveyor roller 13 and a tension roller 14.

The conveyor belt 12 is moved around in the sub-scanning direction by the conveyor roller 13 rotationally driven by the sub-scanning motor 16 via a timing belt 17 and a timing pully 18. This conveyor belt 12 is charged (electric charges are applied) by a charging roller while moving around.

On one end in the main-scanning direction of the carriage 3, a maintenance and recovery mechanism (cleaning unit) 20 configured to maintain and recover the liquid discharging head 4 is disposed beside the conveyor belt 12. On the other end, a dummy discharging receiver 21 configured to receive dummy discharging from the liquid discharging head 4 is disposed beside the conveyor belt 12.

The maintenance and recovery mechanism 20 includes, for example, a capping member 20a to cap a nozzle surface (on which the nozzle is formed) 41 (FIG. 2) of the liquid discharging head 4, a wiping mechanism 20b to wipe the nozzle surface 41, and the dummy discharging receiver 21 to receive droplets not used to form an image.

In addition, an encoder scale 23 forming a particular pattern is tensioned between both side plates along the main-scanning direction of the carriage 3, and the carriage 3 has an encoder sensor 24 including a transmission photosensor that reads the pattern of the encoder scale 23. These encoder scale 23 and the encoder sensor 24 constitute a linear encoder (main scanning encoder) to detect the movement of the carriage 3.

In addition, a cord wheel 25 is mounted onto the shaft of the conveyor roller 13, and an encoder sensor 26 having a transmissive photosensor to detect a pattern formed on the cord wheel 25 is provided. These cord wheel 25 and the encoder sensor 26 constitute a rotary encoder (sub-scanning encoder) to detect the moving and the position of the conveyor belt 12.

In the liquid discharging device having such a configuration, the sheet 10 is fed from a sheet feeder tray, adsorbed to the conveyor belt 12, and conveyed along the subscanning direction in accordance with the rotation of the conveyor belt 12.

By driving the liquid discharging head 4 in response to the image signal while moving the carriage 3 in the main-scanning direction, ink droplets are discharged onto the sheet 10 standing still to record an image in an amount of one line. After the sheet 10 is conveyed in a predetermined amount, the next line is recorded.

On receiving a signal indicating that the recording is finished or the rear end of the sheet 10 has reached the image recording area, the recording operation stops, and the sheet 10 is ejected to an ejection tray.

In addition, the carriage 3 is moved in the printing (recording) standby mode to the maintenance and recovery mechanism 20 to clean the ink discharging head 4 by the maintenance and recovery mechanism 20. Alternatively, the liquid discharging head 4 may not be moved and the maintenance and recovery mechanism 20 may move to clean the liquid discharging head 4.

As illustrated in FIG. 2, the inkjet recording head 4 illustrated in FIG. 1 has two nozzle arrays Na and Nb, each including multiple nozzles 4n. The nozzle array Na of the liquid discharging head 4a discharges black (K) droplets and the other nozzle array Nb discharges cyan (C) droplets. The nozzle array Na of the liquid discharging head 4b discharges magenta (M) droplets and the other nozzle array Nb discharges yellow (Y) droplets.

Figure 3:
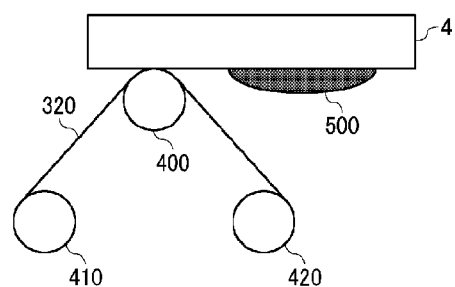
FIG. 3 is a diagram illustrating a schematic configuration of the cleaning unit of the image forming apparatus.

As illustrated in FIG. 3, the wiping mechanism 20b that wipes the nozzle surface includes a wiping member 320 having a sheet-like form, a roller 410 to deliver the wiping member 320, a pressing roller 400 to press the delivered wiping member 320 against the nozzle surface, and a wind-up roller 420 to retrieve the wiping member 320 used for wiping. In addition, the wiping mechanism 20b may furthermore optionally include a rubber blade, etc., to wipe the nozzle surface other than the wiping member 320. The pressing force of the pressing roller 400 can be adjusted by adjusting the distance between the cleaning unit and the nozzle surface 41 by a spring. The pressing roller 400 is not limited to a roller but can be a fixed member made of resin or rubber. In the case of a rubber blade, etc., a mechanism of bringing the rubber blade, etc., into contact with the wiping member 320 having a sheet-like form is provided to impart a cleaning ability of the rubber blade, etc., to the wiping member 320 having a sheet-like form.

After applying a cleaning liquid to the wiping member 320 in a specified amount, the cleaning unit and the liquid discharging head 4 are relatively moved against each other while the wiping member 320 is being pressed against the nozzle surface, thereby wiping foreign matter 500 adhering to the nozzle surface. Examples of the foreign matter 500 adhering to the nozzle surface include, but are not limited to, mist ink produced during discharging of the ink from the nozzles, ink adhering to the nozzle surface when the ink is sucked from the nozzles during, for example, cleaning, adhesion ink which is dried mist ink or dried ink adhering to the cap member on the nozzle surface, and paper dust produced from printed matter. The wiping member 320 may be permeated with the cleaning liquid in advance.

In some sequences, it is possible to dispense with application of the cleaning liquid to the wiping member 320. In particular, if the ink is assumed to be dried and adhere to the nozzle surface after long standby period of time, etc., it is desirable to wipe the nozzle surface multiple times with the wiping member having a sheet-like form filled with the cleaning liquid and remove the foreign matter 500.

The wiping member of the present disclosure includes a first layer to be brought into contact with the nozzle surface and one or more other layers. Also, the following relation is satisfied: t1<t2, where t1 represents the thickness of the first layer and t2 represents the thickness of the one or more other layers and the porosity of the first layer is smaller than the porosity of at least one of the one or more other layers.

Figure 4:
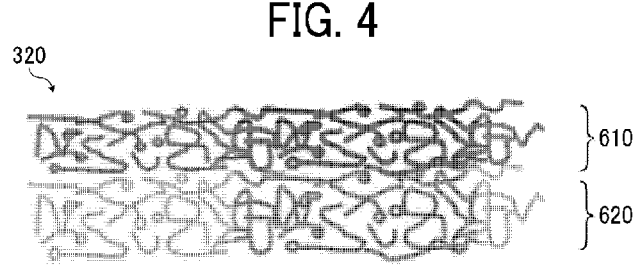
FIG. 4 is a schematic diagram illustrating an example of the cross section of the wiping member according to the present disclosure.

FIG. 4 is a schematic diagram illustrating an example of a cross section of the wiping member 320 of the present disclosure.

The wiping member 320 having a sheet-like form illustrated in FIG. 4 is made of a non-woven fabric and has a two-layer structure of a first layer 610, which is brought into contact with the nozzle surface, and a second layer 620.

As described later, the wiping member 320 may employ a three-or-more-layer structure and include a farthermost layer which is disposed farthermost from the first layer and contacts the nozzle surface like the first layer to remove the foreign matter 500. That is, both sides of the wiping member 320 can be used to remove the foreign matter 500.

Moreover, the wiping member 320 may take another three-layer structure lined with a film to prevent strike through of the ink and reinforce the strength of the wiping material or a multi-layer structure having multiple absorbing layers having different absorption, which are provided as the second layer or thereafter.

Examples of materials constituting the wiping member 320 may include woven fabric, knitted fabric, and porous materials in addition to non-woven fabric. Non-woven fabric is preferable as the first layer because the non-woven fabric is relatively easy to control the thickness and the porosity thereof. Materials of fibers, such as non-woven fabric, woven fabric, and knitted fabric include, but are not limited to, cotton, hemp, silk, pulp, nylon, vinylon, polyester, polypropylene, polyethylene, rayon, cupra, acrylic, and polylactic acid. Non-woven fabric may be made not only of one type of fiber but also be of mixed plural types of fibers. Examples of the porous body include, but are not limited to, polyurethane, polyolefin, and PVA. Examples of methods of manufacturing non-woven fabric include, but are not limited to, wet type, dry type, spun bonding, melt blown, and flash spinning to form webs, and spun lacing, thermal bonding, chemical bonding, and needle punching to bond the webs.

When the thickness t1 of the first layer is less than the total thickness t2 of the layers other than the first layer, and the porosity of the first layer is lower than the porosity of at least one layer other than the first layer, the ability of scraping off the adhesion ink is enhanced, thereby ameliorating wiping ability for the adhesion ink. It is desirable that the total thickness t2 of the layers other than the first layer is about twice or more the thickness t1 of the first layer.

Porosity is Calculated as Follows.

Porosity=1−Apparent density/True density

Regarding sheet-shaped non-woven fabric, etc., the "true density" is the true density of the fiber forming the sheet, and "apparent density" can be obtained by dividing the basis weight of the sheet-shaped material by thickness [basis weight/thickness].

When the thickness is thin and the porosity is small, the wiping member to wipe off the adhesion ink has a high scraping power but cannot hold liquid components of, such as the ink and the cleaning liquid. As a result, a single-layer wiping member has insufficient cleaning ability. Therefore, the wiping member of the present disclosure has a portion capable of holding the liquid component other than the first layer while keeping the relation mentioned above between the layers.

The porosity of the first layer is preferably from 0.60 to 0.85 and more preferably from 0.75 to 0.80. When the porosity of the first layer is from 0.60 to 0.85, the ability of wiping off the adhesion ink can be improved, preventing the wiping member from becoming filmy and ameliorating liquid permeability.

The porosity of at least one of the one or more layers is preferably from 0.80 to 0.99. When the porosity of the layer other than the first layer is within the above range, the liquid absorbency can be improved. By combining the first layer and the layers other than the first layer, the wiping member can strike a balance between scraping ability and liquid absorption, thereby improving wiping ability.

The thickness of the wiping member is preferably from 0.1 to 3 mm and more preferably from 0.2 to 0.7 mm. Since the thickness of the wiping member is 0.1 mm or more, a saturated water absorption amount of the liquid per area of the wiping member is sufficient, and the target ink can be sufficiently absorbed. Further, since the thickness of the wiping member is 3 mm or less, the liquid component of the ink can be still transferred from the first layer to the layer other than the first layer without degrading the absorption power of the layer other than the first layer. Therefore, the apparatus can be down-sized.

At least the first layer of the wiping member is desirably made of non-woven fabric. When non-woven fabric is used, a desirable numerical range of the thickness and a desirable numerical range of the porosity can be easily set.

When the one or more other layers include at least two layers and the following relations are satisfied: t1<t4; and t3<t4, where t3 represents the thickness of the farthermost layer of the one or more other layers located farthermost from the first layer, t4 represents the total thickness of the one or more other layers excluding the farthermost layer, and the porosity of the first layer and the porosity of the farthermost layer are smaller than the porosity of at least one of the one or more other layers excluding the farthermost layer, it is possible to wipe off the adhesion ink with good wiping property using both sides of the wiping member.

Figure 5:
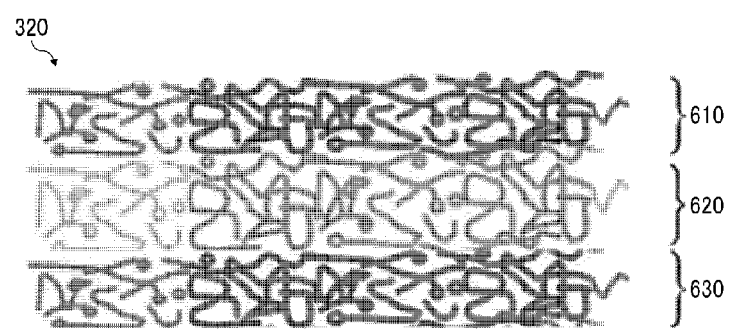
FIG. 5 is a schematic diagram illustrating another example of the cross-section of the wiping member according to the present disclosure.

FIG. 5 is a schematic diagram illustrating an example of a cross section of the wiping member 320 having the farthermost layer.

The wiping member 320 having a sheet-like form illustrated in FIG. 5 is made of non-woven fabric and has a three-layered structure consisting of a first layer 610, a second layer 620, and a farthermost layer 630 located at a position farthermost from the first layer 610, from the side in contact with the nozzle surface. Like the first layer 610, the farthermost layer 630 is brought into contact with the nozzle surface to wipe off the adhesion ink. The thickness t1 of the first layer 610 and the thickness t3 of the farthermost layer 630 are thinner than the thickness of the second layer 620, and the porosity of the first layer 610 and the porosity of the farthermost layer 630 are smaller than the porosity of the second layer 620. The first layer 610 and the farthermost layer 630 may be identical. Alternatively, the farthermost layer 630 may have a different configuration from the first layer 610 if the farthermost layer 630 is thinner than the second layer 620 and the porosity of the farthermost layer 630 is lower than that of the second layer 620.

FIG. 5 is a diagram illustrating a three-layer structure. Alternatively, a multilayer structure of four or more layers having multiple absorbing layers having different absorption are provided between the second layer 620 and the farthermost layer 630 may be used.

With this configuration, the nozzle surface can be wiped by using both surfaces of the wiping member.

In the image forming apparatus, the wiping member 320 having a sheet-like form may be rolled up and the roll may be changed to invert the front and back surfaces, or a reversing mechanism may be used. Therefore, both surfaces of the wiping member 320 can be used.

The porosity of the farthermost layer 630 can also be calculated by the relation 1 mentioned above.

Each of the thickness of the first layer and the thickness of the farthermost layer is desirably thinner than the total thickness of the first layer and the one or more other layers excluding the farthermost layer.

The porosity of the farthermost layer is preferably from 0.60 to 0.85 and more preferably from 0.75 to 0.80. When the porosity of the farthermost layer is from 0.60 to 0.85, the ability of wiping off the adhesion ink can be improved, preventing the wiping member from becoming filmy and ameliorating liquid permeability.

Examples of materials constituting the farthermost layer may include non-woven fabric, woven fabric, knitted fabric, and porous materials. Non-woven fabric is desirably used because thickness and porosity are relatively easily controlled. Materials of fibers, such as non-woven fabric, woven fabric, and knitted fabric include, but are not limited to, cotton, hemp, silk, pulp, nylon, vinylon, polyester, polypropylene, polyethylene, rayon, cupra, acrylic, and polylactic acid. Non-woven fabric may be made not only of one type of fiber but also be of mixed plural types of fibers. Examples of the porous body include, but are not limited to, polyurethane, polyolefin, and PVA. Examples of methods of manufacturing non-woven fabric include, but are not limited to, wet type, dry type, spun bonding, melt blown, and flash spinning to form webs, and spun lacing, thermal bonding, chemical bonding, and needle punching to bond the webs.

The wiping surface of the wiping member 320 desirably has a surface roughness Rz of 170 μm or more obtained by surface roughness measurement by using, for example, a laser microscope. When the surface roughness Rz of the wiping surface is 170 μm or more, the meniscus in the nozzle is not easily broken so that the nozzle surface can be wiped without causing discharging defects.

EXAMPLES

Next, embodiments of the present disclosure are described in detail with reference to Examples but are not limited thereto.

Examples 1 to 30 and Comparative Examples 1 to 4

Using an inkjet head (Ricoh MH 5440), 0.1 ml of RICOH Pro AR ink white was dripped onto the nozzle plate of the head, which was thereafter left for 15 hours to cause the ink to adhere to the nozzle plate.

Wiping members of Examples 1 to 30 and Comparative Examples 1 to 4 were prepared according to the formulation shown in Table 1 below.

Using the wiping members shown in Table 1, 20 μl/cm² of the following cleaning liquid was applied to the first layer brought into contact with the nozzle surface of the wiping member. Thereafter, the surface of the nozzle plate was wiped under the following conditions: pressing force of 3 N; and wiping speed of 50 mm/s.

Composition of Cleaning Liquid
- 3-methoxy-3-methyl-1-butanol (manufactured by KURARAY CO., LTD.): 20 percent by mass
- Polyether-modified silicone surfactant (WET270, manufactured by Evonik Degussa Japan Co., Ltd.): 1 percent by mass
- Deionized water: Balance Evaluation Evaluation Method The nozzle plate after wiping was visually checked and removal of the adhesion ink was evaluated based on the number of wiping operations taken until the adhesion ink was removed.

For the obtained results, the wiping members were determined as practically usable when graded B or above, preferable when graded A or above, and more preferable when graded S according to the following evaluation criteria.

Evaluation Criteria
- S: Adhesion ink on nozzle plate was removed by five wiping operations.
- A: Adhesion ink on nozzle plate was removed by seven wiping operations.
- B: Adhesion ink on nozzle surface was removed by ten or less wiping operations.
- C: Adhesion ink remained after ten wiping operations.

Regarding the wiping members of Examples 27 to 30, the front and back surfaces of the wiping member were reversed, 20 μl/cm² of the above-described cleaning liquid was applied to the third layer shown in Table 1 and thereafter brought into contact with the nozzle surface followed by the same evaluation as for the first layer brought into contact with the nozzle surface.

TABLE 1

|  | Fiber used | | |
| --- | --- | --- | --- |
|  | First layer | Second layer | Third layer |
| Example 1 | Polyester | Rayon | — |
| Example 2 | Polyester | Rayon | — |
| Example 3 | Polyester | Rayon | — |
| Example 4 | Polyester | Rayon | — |
| Example 5 | Polyester | Rayon | — |
| Example 6 | Polyester | Rayon | — |
| Example 7 | Polyester | Rayon | — |
| Example 8 | Polyester | Rayon | — |
| Example 9 | Polyester | Rayon | — |
| Example 10 | Polyester | Rayon | — |
| Example 11 | Polyester | Rayon | — |
| Example 12 | Polyester | Rayon | — |
| Example 13 | Polyester | Rayon | — |
| Example 14 | Polyester | Rayon | — |
| Example 15 | Polyester | Rayon | — |
| Example 16 | Polyester | Rayon | — |
| Example 17 | Polyester | Rayon | — |
| Example 18 | Polyester | Rayon | — |
| Example 19 | Polyester | Rayon | — |
| Example 20 | Polyester | Rayon | — |
| Example 21 | Polyester | Rayon | — |
| Example 22 | Polyester | Rayon | — |
| Example 23 | Polyolefin | Rayon - polyolefin (mixing ratio: 50 to 50) | — |
| Example 24 | Polyester | Polyolefin porous body | — |
| Example 25 | Polyester | Rayon | PET film |
| Example 26 | Polyester | Rayon | Rayon |
| Example 27 | Polyester | Rayon | Polyester |
| Example 28 | Polyester | Rayon | Polyester |
| Example 29 | Polyester | Rayon | Polyester |
| Example 30 | Polyester | Rayon | Polyester |
| Comparative Example 1 | Polyester | Rayon | — |
| Comparative Example 2 | Polyester | Rayon | — |
| Comparative Example 3 | Polyester | Rayon | — |

TABLE 1-continued

| | | | | | | | | |
|---|---|---|---|---|---|---|---|---|
| Comparative Example 4 | Polyester | | Rayon | | — | | | |

| | Thickness (mm) | | | Porosity | | | Result | |
|---|---|---|---|---|---|---|---|---|
| | First layer | Second layer | Third layer | First layer | Second layer | Third layer | First layer | Third layer |
| Example 1 | 0.06 | 0.25 | — | 0.58 | 0.80 | — | B | — |
| Example 2 | 0.06 | 0.25 | — | 0.60 | 0.80 | — | A | — |
| Example 3 | 0.06 | 0.25 | — | 0.74 | 0.80 | — | A | — |
| Example 4 | 0.06 | 0.25 | — | 0.75 | 0.80 | — | S | — |
| Example 5 | 0.06 | 0.25 | — | 0.80 | 0.82 | — | S | — |
| Example 6 | 0.06 | 0.25 | — | 0.81 | 0.82 | — | A | — |
| Example 7 | 0.06 | 0.25 | — | 0.85 | 0.87 | — | A | — |
| Example 8 | 0.06 | 0.25 | — | 0.88 | 0.90 | — | B | — |
| Example 9 | 0.06 | 0.25 | — | 0.58 | 0.99 | — | B | — |
| Example 10 | 0.06 | 0.25 | — | 0.60 | 0.99 | — | A | — |
| Example 11 | 0.06 | 0.25 | — | 0.74 | 0.99 | — | A | — |
| Example 12 | 0.06 | 0.25 | — | 0.75 | 0.99 | — | S | — |
| Example 13 | 0.06 | 0.25 | — | 0.80 | 0.99 | — | S | — |
| Example 14 | 0.06 | 0.25 | — | 0.81 | 0.99 | — | A | — |
| Example 15 | 0.06 | 0.25 | — | 0.85 | 0.99 | — | A | — |
| Example 16 | 0.06 | 0.25 | — | 0.88 | 0.99 | — | B | — |
| Example 17 | 0.06 | 0.25 | — | 0.60 | 0.78 | — | B | — |
| Example 18 | 0.06 | 0.25 | — | 0.74 | 0.78 | — | B | — |
| Example 19 | 0.06 | 0.25 | — | 0.75 | 0.78 | — | A | — |
| Example 20 | 0.06 | 0.25 | — | 0.77 | 0.88 | — | S | — |
| Example 21 | 0.12 | 0.50 | — | 0.75 | 0.80 | — | S | — |
| Example 22 | 0.05 | 0.10 | — | 0.75 | 0.80 | — | S | — |
| Example 23 | 0.06 | 0.25 | — | 0.77 | 0.88 | — | S | — |
| Example 24 | 0.06 | 0.25 | — | 0.77 | 0.88 | — | S | — |
| Example 25 | 0.06 | 0.25 | 0.10 | 0.77 | 0.88 | 0 | S | — |
| Example 26 | 0.06 | 0.10 | 0.12 | 0.77 | 0.82 | 0.95 | S | — |
| Example 27 | 0.06 | 0.25 | 0.06 | 0.75 | 0.80 | 0.76 | S | S |
| Example 28 | 0.06 | 0.25 | 0.06 | 0.76 | 0.80 | 0.74 | S | A |
| Example 29 | 0.06 | 0.25 | 0.06 | 0.74 | 0.80 | 0.74 | A | A |
| Example 30 | 0.06 | 0.25 | 0.06 | 0.60 | 0.81 | 0.60 | A | A |
| Comparative Example 1 | 0.06 | 0.25 | — | 0.85 | 0.81 | — | C | — |
| Comparative Example 2 | 0.30 | 0.10 | — | 0.78 | 0.92 | — | C | — |
| Comparative Example 3 | 0.12 | 0.50 | — | 0.85 | 0.81 | — | C | — |
| Comparative Example 4 | 0.12 | 0.05 | — | 0.85 | 0.81 | — | C | — |

In comparison between Examples and Comparative Examples 1, 3, and 4, wiping ability for adhesion ink is found to deteriorate when the porosity of the first layer is greater than the porosity of the second layer.

In the comparison between Examples and Comparative Examples 2 and 4, wiping ability for the adhesion ink is found to deteriorate when the thickness of the first layer is greater than the thickness of the second layer.

As seen in the results of Examples 27, 28, 29, and 30, the adhesion ink can be wiped off by using both sides.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to 35 U.S.C. § 119(a) to Japanese Patent Application Nos. 2018-49359 and 2018-210538, filed on Mar. 16, 2018 and Nov. 8, 2018, respectively, in the Japan Patent Office, the entire disclosures of which are hereby incorporated by reference herein.

REFERENCE SIGNS LIST

1 Main guide member
3 Carriage
4, 4a, 4b Recording head
4n Nozzle
5 Main scanning motor
6 Driving pulley
7 Driven pulley
8 Timing belt
10 Sheet
12 Conveyor belt
13 Conveyor roller
14 Tension roller
16 Sub-scanning motor
17 Timing belt
18 Timing pulley
20 Maintenance recovery assembly
21 Dummy ink discharging receiver
20a Cap member
20b Wiping mechanism
23 Encoder sensor
24 Encoder sensor
25 Cord Wheel
26 Encoder sensor
320 Wiping member (wiper)

400 Pressing roller
410 Roller
420 Wind-up roller
500 Foreign matter
610 First layer
620 Second layer
630 Farthermost layer (layer located farthermost from first layer)
Na, Nb Nozzle array

The invention claimed is:

1. A wiping member configured to wipe a nozzle surface of a liquid discharging head, the wiping member comprising:
 a cleaning liquid,
 a first layer configured to be brought into contact with the nozzle surface and to which the cleaning liquid is applied, and
 one or more other layers,
 wherein the following relation is satisfied: t1<t2, where t1 represents a thickness of the first layer and t2 represents a thickness of the one or more other layers, and
 wherein a porosity of the first layer is smaller than a porosity of at least one of the one or more other layers, and
 wherein the porosity of the first layer is from 0.60 to 0.85, and
 wherein the porosity of at least one of the one or more other layers is from 0.80 to 0.99.

2. The wiping member according to claim 1, wherein the porosity of the first layer is from 0.75 to 0.80.

3. The wiping member according to claim 1, wherein the first layer is made of non-woven fabric.

4. The wiping member according to claim 1, the wiping member having a thickness of from 0.1 to 3 mm.

5. The wiping member according to claim 1,
 wherein the one or more other layers comprises at least two layers and the following relations are satisfied: t1<t4; and t3<t4, where t3 represents a thickness of a farthermost layer of the one or more other layers located farthermost from the first layer, t4 represents a total thickness of the one or more other layers excluding the farthermost layer, and
 wherein the porosity of the first layer and a porosity of the farthermost layer are smaller than a porosity of at least one of the one or more other layers excluding, the farthermost layer.

6. The wiping member according to claim 5, wherein the porosity of the farthermost layer is from 0.60 to 0.85.

7. The wiping member according to claim 5, wherein the porosity of the farthermost layer is from 0.75 to 0.80.

8. The wiping member according to claim 1, wherein the wiping member comprises
 said first layer, and
 wherein the one or more other layers consists.

9. The wiping member according to claim 8, wherein the first layer comprises polyester fibers.

10. The wiping member according to claim 8, wherein the second layer comprises rayon fibers.

11. The wiping member according to claim 8, wherein the first layer has a thickness of 0.06 mm and the second layer has a thickness of 0.25 mm.

12. The wiping member according to claim 8, wherein the first layer has a porosity of 0.81 to 0.85, and
 the second layer has a porosity of 0.82 to 0.99.

13. The wiping member according to claim 1, wherein the liquid discharging head is a liquid discharging head of an ink jet printer.

14. The wiping member according to claim 13, which is capable of wiping ink adhering to a nozzle surface of the liquid discharge head.

* * * * *